Figure 1:
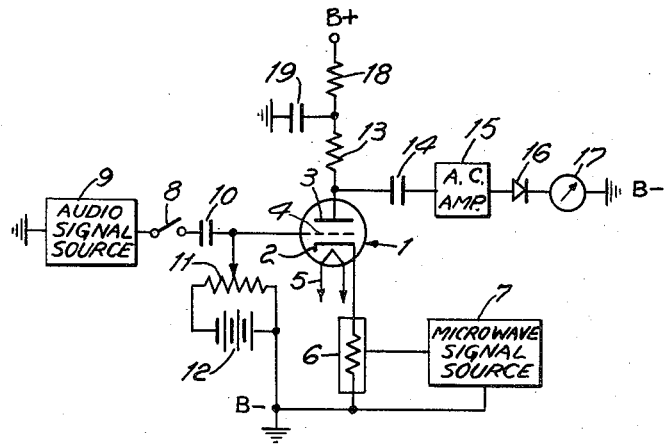

Sept. 30, 1958      D. M. SHARP      2,854,634

MICROWAVE DETECTOR CIRCUIT

Filed May 3, 1956

INVENTOR
DOUGLAS M. SHARP
BY Henry Kolin
AGENT

United States Patent Office 2,854,634
Patented Sept. 30, 1958

2,854,634

MICROWAVE DETECTOR CIRCUIT

Douglas M. Sharp, Allendale, N. J., assignor to International Telephone and Telegraph Corporation, Nutley, N. J., a corporation of Maryland Application May 3, 1956, Serial No. 582,554

4 Claims. (Cl. 324—120)

This invention relates to methods and means for detecting and measuring electromagnetic wave energy and more specifically to the utilization for this purpose of a simple circuit arrangement for measuring power variations in both continuous-wave and modulated microwave signals.

Microwave energy is ordinarily measured by either thermal or electrical methods. The electrical methods for the detection of microwave energy involve rectification of this microwave energy, i. e., conversion to a lower frequency by means of a non-linear element, and the detection of this energy by ordinary low-frequency techniques. Useful non-linear electrical devices for accomplishing this demodulation are the germanium and silicon crystal detectors. These may be of the point-contact or junction type, and, in general, have good non-linearity response at microwave frequencies. However, such crystal detector devices as now known are not operable at substantially elevated ambient temperatures. Furthermore, their power-handling capabilities with respect to withstanding high-peak powers are severely limited. Also, these devices are frequently erratic and unreliable in use.

Attempts have also been made to use close-spaced vacuum diodes for microwave detection. Because of the large transit time of the electrons between the elements of the tubes, the conversion or rectification efficiency is relatively low. Attempts to improve this rectification efficiency by a closer spacing of the electrode elements have proven unsatisfactory. The precise tolerances required for this close spacing make such tubes extremely difficult to construct with any degree of reliability.

Where the thermal method is used, the high-frequency power propagated is converted to heat, which is then measured by a temperature-responsive techinque. For high-level power, that is, in excess of one watt, measurement of the thermal energy is usually made by a calorimetric method, using either water or a gas such as ammonia as the calorimetric fluid. For low- and medium-level power measurements, various types of bolometers, principally those such as the barreter and the thermistor, have been used. These latter are temperature-responsive relatively sensitive power detectors which are capable of masuring a few microwatts of power when used in properly designed bridge circuits. The individual characteristics of these temperature-sensitive devices vary, some being relatively slow acting compared to others; and their over-all sensitivity further depends upon the precision and sensitivity of the various complex measuring circuits, such as bridge circuits, in which they are used.

One of the difficulties existing in obtaining indications of low-power variations using bolometers is where the microwave signal source to be detected and measured is a continuous-wave signal. Because of the limited sensitivity of the bolometer as well as the associated circuitry, which may require precise temperature compensation, relatively small changes in the power level of continuous-wave microwave signals cannot be determined. Either a mechanical chopper to modulate the continuous-wave signal or a direct-current amplifier must be used in order to detect the low-level continuous-wave radio-frequency power variations. Such devices limit the over-all sensitivity. Noise is introduced, for example, with a mechanical chopper, or drift occurs when using a direct-current amplifier. Furthermore, a circuit used to detect and measure power variations occurring in modulated microwave signals is generally not equally suitable for use where unmodulated continuous-wave microwave signals are to be detected. Also, existing circuitry requires the use of impedance-matching transformers as well as the provision of separate direct-current biasing sources for the bolometer used. A considerable need therefore exists for a simple, reliable circuit arrangement for detecting and measuring microwave signal energy, particularly of the continuous-wave type.

It is an object of the present invention to provide a simple detector for microwave energy that is free from the limitations of known devices as hereinbefore described.

It is a further object to provide such a detector that is equally suitable for detecting low-power variations in microwave signals whether of the continuous-wave or modulated type.

It is a feature of this invention that a simple versatile circuit arrangement is provided wherein a bolometer forms part of the biasing arrangement of the cathode circuit of a vacuum tube, thereby eliminating the need for a separate direct-current biasing source for the bolometer.

It is a further feature that where the microwave signal impressed on the bolometer is of a continuous-wave nature, means are provided for impressing an audio signal on the grid of the vacuum tube so that the direct-current level of the detected microwave signal, i. e., variation in power therein, is modulated by the audio signal, this modulated output then being in turn readily detected by conventional low-frequency techniques.

Figure 2:
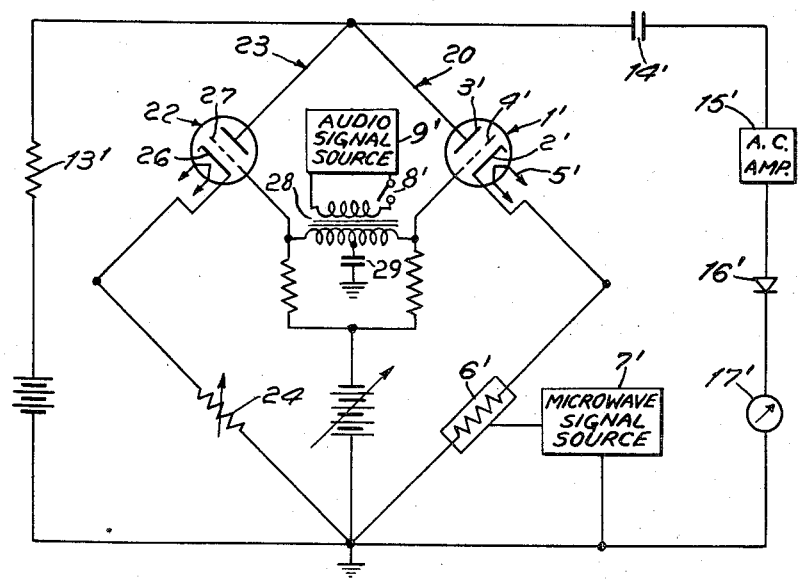

The above-mentioned and other features and objects of this invention and the manner of attaining them will become more apparent by reference to the following description taken in conjunction with the accompanying drawings, wherein:

Fig. 1 is a schematic circuit arrangement of a bolometer for the direct reading of power variations in microwave signals whether of the continuous-wave or modulated type; and Fig. 2 is a schematic circuit arrangement of a bolometer in a balanced circuit for the detection and measurement of microwave signals of the continuous-wave and modulated types.

Referring to Fig. 1, an electron vacuum tube 1 is shown having at least a cathode 2 and anode 3, and preferably a grid 4. This tube is preferably a triode vacuum tube of the indirectly heated type having a separate heater filament 5. The bolometer 6 is connected in the cathode circuit of the tube and serves as a cathode bias resistor as well, at the same time providing degenerative operation to obtain improved stability. While barreters and thermistors are commonly employed and preferred as bolometers, other suitable temperature-responsive resistance devices, such as tungsten filaments, may also be used. The microwave signal source 7 is applied to the bolometer as shown in Fig. 1. This source may be in the form of a microwave generator or other appropriate signal source. Where this source is of a modulated type, switch 8 is left open. For this type of operation, the grid circuit is effectively inoperative. Where the microwave signal source is of a continuous-wave type, switch 8 is closed, thereby coupling audio signal source 9 through capacitor 10 to the grid 4, which is biased by variable resistor 11 and direct-current voltage source 12. The resultant signal appearing in the anode circuit will then have an audio frequency component which varies in amplitude according to variations of cathode bias and therefore of the amplification factor, as determined by any direct-current change across the bolometer resulting from a power change in the continuous-wave microwave signal. This will appear across resistor 13 and be coupled through capacitor 14 to alternating-current amplifier 15, rectifier 16 and indicator 17. Resistor 18 and capacitor 19 are preferably selected to have a relatively long time constant and thereby protect the bolometer from power-supply surges. In use, the value of grid biasing resistor 11 would be adjusted with no microwave signal or audio signal present in order to have the anode current agree with the bolometer bias specifications. The above circuit would be essentially of the direct-reading type, and the amplifier 15 may be tuned for desired frequencies in order to improve sensitivity and gain.

In Fig. 2 is shown a balanced circuit utilizing the same principles of detection and measurement as described in conjunction with Fig. 1. Thus, the bolometer is similarly connected in the cathode circuit, thereby obviating the need for a separate biasing source for the bolometer and also providing degenerative operation to obtain improved stability. Corresponding circuit components in Fig. 2 have been numbered to correspond to the numbering of Fig. 1. The method of operation of this circuit will be understood from the operation described for Fig. 1. The vacuum tube 1' having a cathode, anode and grid is connected in a first branch 20 of this balanced circuit in series with bolometer 6', which is connected between the cathode 2' and ground. A second vacuum tube 22 is connected in a second branch of this circuit in series with a variable resistance 24, which is connected between the cathode 26 and ground. Both anodes of the two tubes are connected together at one junction of the two branches, and resistance 24 and bolometer 6' are connected together and to ground at the other junction. Signals from audio signal source 9' are coupled through transformer 28 to grids 4' and 27 of tubes 1' and 22. The center tap of transformer 28 is coupled to ground through a condenser 29. It should be noted that the audio signal coupled to each of these grids is of opposite phase and equal in amplitude. Variations in power of the microwave signal produce variation of cathode bias in the first branch, thereby varying the amplification factor of tube 1' and the audio signal output from this branch. The audio signal output from the second branch similarly depends upon the setting of resistance 24. Since the signals from the two branches are of opposite phase, the difference in amplitude is applied to the detector circuit connected to the junctions of the branches, to thereby measure the amplitude of the microwave signal.

Such a balanced circuit provides somewhat more sensitivity than can be obtained with the circuit illustrated in Fig. 1. Both of the circuits illustrated in Figs. 1 and 2 are equally versatile in being capable of use with both continuous-wave or modulated microwave signal sources.

In Table I is shown the manner in which the circuits of Figs. 1 and 2 respond to changes in the microwave power level, determined for conditions where a continuous-wave (C. W.) microwave signal is impressed across the bolometer and an artificial audio signal of fixed amplitude is used for modulating purposes.

Table I

| Signal Conditions | Meter Indication | |
|---|---|---|
| | Fig. 1 Circuit | Fig. 2 Circuit |
| No C. W. Microwave Signal, Fixed Audio Signal Added. | Maximum Reading | Zero Reading. |
| Small C. W. Microwave Signal, Fixed Audio Signal Added. | Lower Reading | Increased Reading. |
| Large C. W. Microwave Signal, Fixed Audio Signal Added. | Lowest Reading | Maximum Reading. |

As may be seen from the foregoing description, the circuit arrangements provided in Figs. 1 and 2 are considerably simpler than those utilized heretofore, namely, impedance-matching transformers and separate direct-current bias for the bolometer have been eliminated, and, furthermore, the bolometer may be used to detect changes in power level for both continuous-wave and modulated microwave signal sources. While this invention has been illustrated by the use of an electron vacuum tube, other multielectrode devices may be used, such as point-contact and junction transistors and gas discharge tubes, with appropriate circuit modifications where required. The use of the bolometer to serve as the biasing source for the multielectrode device as well as use of one electrode on which an audio signal is impressed for modulating the microwave signal is considered characteristic of transistor-amplifier devices. As illustrated herein, however, this invention finds its preferred use with a triode-type vacuum tube. The circuit arrangements described find their greatest utility for the detection and measurement of low-power microwave signals, namely, those below 10 milliwatts; they may equally well be used for medium-power detection, from 10 milliwatts to 1 watt, and for high-power detection, about 1 watt. Basically, the limitations imposed on the power peaks handled by the device are those presented by the power-handling capabilities of the multielectrode device and the bolometer. While the system described is capable of acting as a microwave detector at a frequency range of 100 to 20,000 megacycles, a preferred range is between 1,000 and 12,000 megacycles.

While I have described above the principles of my invention in connection with specific circuit arrangements, it is to be clearly understood that this description is made only by way of example and not as a limitation to the scope of my invention as set forth in the objects thereof and in the accompanying claims.

I claim:

1. A system for detecting electromagnetic wave energy comprising a balanced circuit including a first and second branch, each connected between a first and a second junction point, said first branch comprising a first electron tube having a cathode, anode and grid in series with a bolometer connected between said cathode and said second junction point, said second branch comprising a second electron tube having a cathode, anode and grid in series with a variable resistance connected between the cathode of said second tube and said second junction point, the anode of each said tube being connected to the said first junction point, means for impressing a microwave signal on said bolometer, an audio signal source, said audio signal source being coupled to each of said grids to apply an audio signal of opposite phase and substantially equal in amplitude with respect to said second junction point to each said grid, whereby variations in said microwave signal produce variations of net audio signal output from said balanced circuit, and a detector circuit connected between said first and second junction points for detecting the amplitude of said net audio signal output.

2. A system for detecting electromagnetic wave energy comprising a multielectrode device, a reference potential, bias means coupled between said reference potential and one of said electrodes at a predetermined fixed value, a bolometer coupled between said reference potential and another of said electrodes to establish a bias for said another of said electrodes, means for impressing a microwave signal on said bolometer to vary the bias of said another of said electrodes in accordance with power level variations of said microwave signal, an external audio signal source having a fixed amplitude output, selective means to couple the audio signal of said audio signal source at will to said one of said electrodes, the variations of the bias of said another of said electrodes amplitude modulating said audio signal, and means coupled to a third electrode of said electrodes for detecting the audio signal output level to thereby measure the level of said microwave signal.

3. A system for detecting electromagnetic wave energy comprising an electron tube having a cathode, anode and grid, a reference potential, bias means coupled between said reference potential and said grid of said electron tube at a predetermined fixed value, a bolometer coupled between said reference potential and said cathode of said electron tube to establish a bias for said cathode, means for impressing a microwave signal on said bolometer to vary the bias of said cathode in accordance with power level variations of said microwave signal, an external audio signal source having a fixed amplitude output, selective means to couple the audio signal of said audio signal source at will to said grid, the variations of the bias of said cathode amplitude modulating said audio signal, and means coupled to the anode of said electron tube for detecting the audio signal output level to thereby measure the level of said microwave signal.

4. A system for measuring continuous wave radio-frequency power comprising an electron tube having a cathode, anode and grid, a reference potential, bias means coupled between said reference potential and said grid of said electron tube at a predetermined fixed value, a bolometer coupled between said reference potential and said cathode of said electron tube to establish a bias for said cathode, means for impressing a continuous wave microwave signal on said bolometer to vary the bias of said cathode in accordance with power level variations of said microwave signal, an external audio signal source having a fixed amplitude output connected to said grid to couple an audio signal thereon, the variations of the bias of said cathode amplitude modulating said audio signal, and means coupled to the anode of said electron tube for detecting the audio signal output level to thereby measure the level of said continuous wave microwave signal.

References Cited in the file of this patent

Article by B. P. Hand, published in Hewlett Packard Journal, vol. 1, No. 9, May 1950. Copy available in 324–95.